Jan. 31, 1961  F. E. KNECHT  2,969,944
ARRESTING GEAR WITH SLIDING SHEAVE, CABLE SHOCK
VIBRATION DAMPER AND SLACK TAKE-UP MECHANISM
Filed March 29, 1957  2 Sheets-Sheet 1
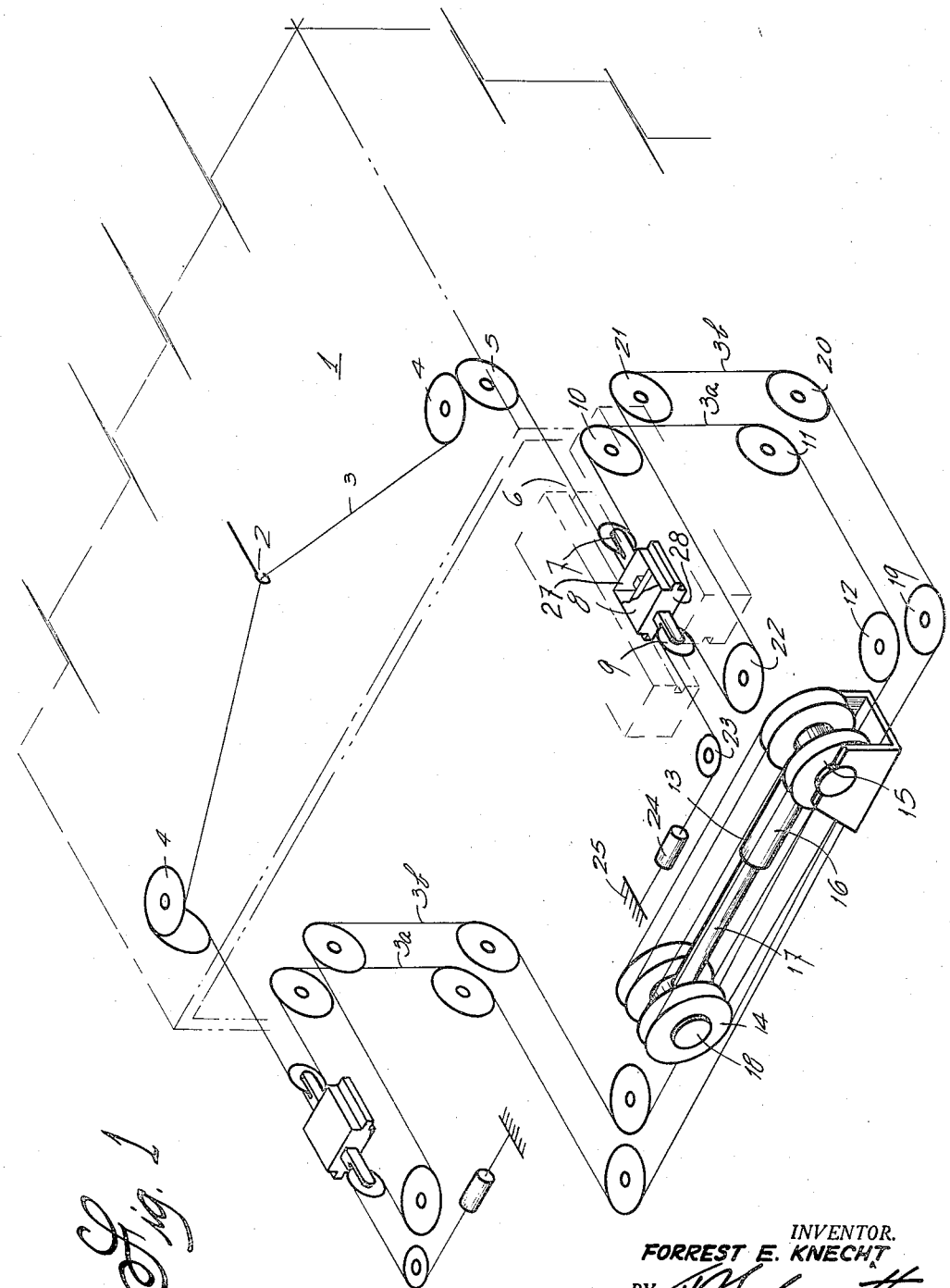
Fig. 1
INVENTOR.
FORREST E. KNECHT
BY
ATTORNEYS

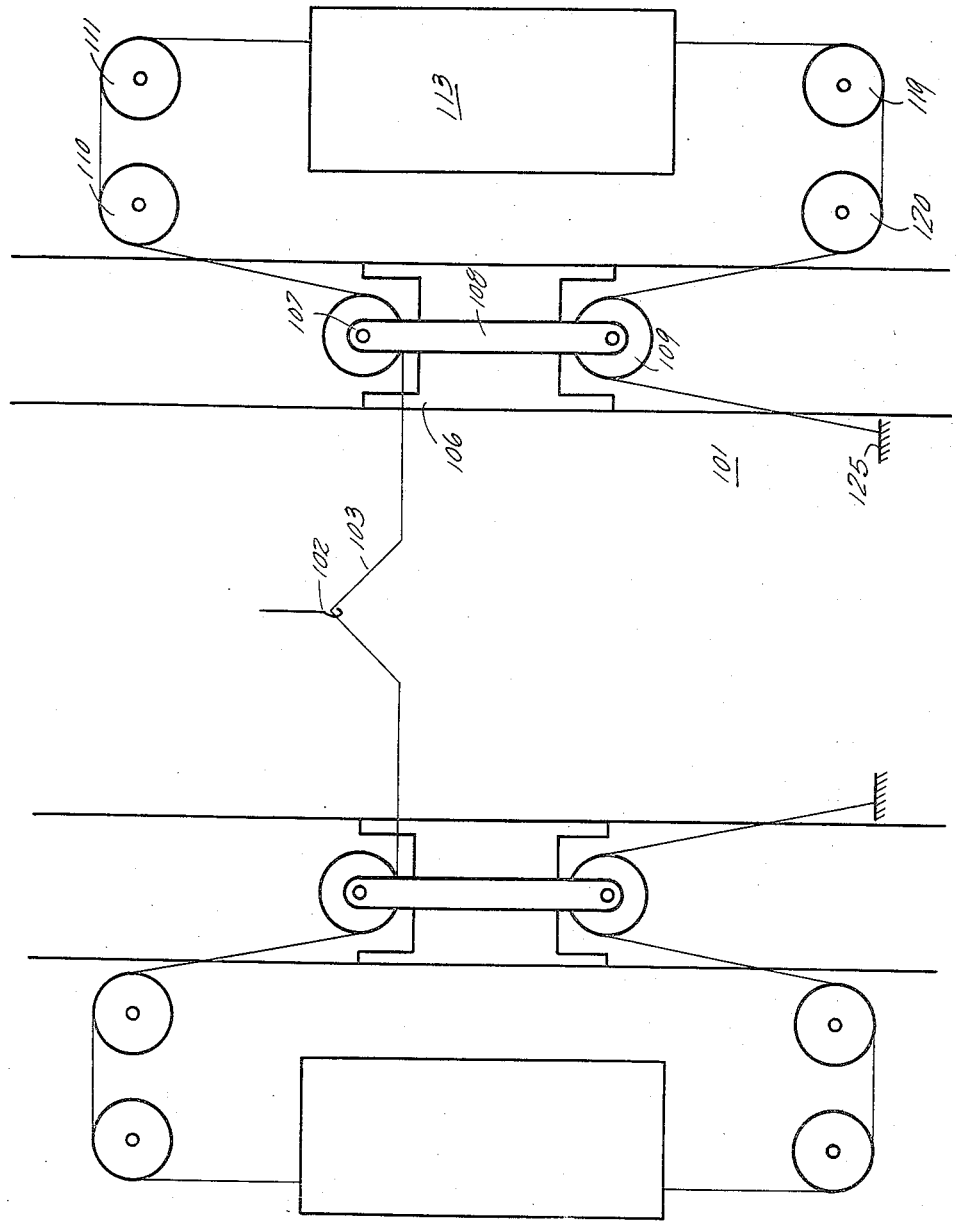

United States Patent Office 2,969,944
Patented Jan. 31, 1961

2,969,944

ARRESTING GEAR WITH SLIDING SHEAVE, CABLE SHOCK VIBRATION DAMPER AND SLACK TAKE-UP MECHANISM

Forrest E. Knecht, Catawba Ave., Newfield, N.J.

Filed Mar. 29, 1957, Ser. No. 649,583

3 Claims. (Cl. 244—110)

(Granted under Title 35, U.S. Code (1952), sec. 266)

The invention described herein may be manufactured and used by or for the Government of the United States of America for governmental purposes without the payment of any royalties thereon or therefor.

This invention relates to a cable reeved arresting system for fast moving objects such as aircraft.

An object of this invention is an arresting system utilizing an arresting cable wherein the peak tensions in the cable are greatly reduced.

A further object of this invention is an arresting system utilizing a cable wherein the cable slack created during an ordinary arrestment is virtually eliminated.

Still a further object of this invention is an arresting system wherein a damping of the cable vibratory tension occurs resulting in a smoother aircraft or load deceleration.

These and other objects will be readily apparent from an examination of the following description and the attached drawings wherein:

Figure 1 is a diagrammatic sketch of one embodiment of the improved arresting system, and Figure 2 is a diagrammatic sketch of a second embodiment of the arresting engine.

Referring to Figure 1 a landing or arresting strip 1 has strung across its width an arresting cable 3. An aircraft hook 2 is shown engaging the cable 3. It is assumed that hook 2 is attached to an aircraft or some high-speed load or other type of moveable object. Cable 3 is reeved through deck sheaves 4 and 5 and around a sliding sheave 7. The latter sheave is attached to a sliding shock absorber 8 which is free to ride in a track 6 parallel to the runway 1. Cable 3 is further reeved around a plurality of fixed sheaves 10, 11 and 12 and around the moveable sheaves 14 and fixed sheaves 15 of an arresting engine 13. The engine is of standard construction and consists of a crosshead 18 having mounted thereon sheaves 14. A piston assembly 17 sliding in a cylinder 16 is attached to the moveable crosshead. The fixed sheaves 15 and the associated cylinder 16 are fixedly secured relative to the strip 1, as is customary. Cable 3 after passing through the engine is reeved through fixed sheaves 19, 20, 21, 22 and around sheave 9. The latter sheave is also secured to the sliding absorber 8. The absorber is of a conventional piston cylinder arrangement with the piston 27 attached to one sheave 9, for example, and the cylinder 28 attached to the opposite sheave 7; the sheaves 9 and 7 are then moveable and fixed, respectively, as to the cylinder.

After reeving through sheave 9, cable 3 is reeved around fixed sheaves 23 and is secured to anchor 25 via a shock absorber 24.

The opposite half of Figure 1 is symmetrical to that portion of the cable system described, therefore no numerals are attached thereto, it being assumed that the structure and operation of the two half portions are identical.

In the matter of terminology, that portion of the cable from hook 2 around sheaves 4, 5, 7, 10, 11 and 12 is commonly referred to as the purchase cables; that portion of the cable from the engine 13 to the anchor 25 is commonly referred to as the anchor cable.

In the modification of Figure 2, the reeving arrangement is very similar to that described in Figure 1. Thus cable 103 is reeved through moveable sheave 107 of a shock absorber 108 mounted for sliding movement in a track 106, around fixed sheaves 110 and 111 and through the arresting engine 113. From the engine, the cable continues around sheaves 119 and 120, slideable sheave 109, and secured to anchor 125. The main difference between the arrangements of Figures 1 and 2 is that in the first arrangement cable 3 after leaving the deck 1 is reeved around a fixed sheave 4 before continuing on to the sliding sheave assembly. In the second modification, on the other hand, the cable is passed directly around the sliding sheave assembly before passing on to the arresting engine 113.

The advantages of the modification of Figure 1 are that (a) the sliding sheave assembly may be located away from the landing or arresting area and the entire system may be double reeved to two cross deck pendants if so desired.

The advantage of the modification of Figure 2 is that any transverse impact of the wave front on the moveable sheave 107 will cause the sheave to move to absorb some of this impact immediately.

The opertaion of the two modifications is basically the same. The following description, therefore, on the modification of Figure 1 will apply also to the modification of Figure 2.

Referring to Figure 1, the arresting hook 2 of the aircraft or load engages the cable 3 forming a maintained stress wave front. The impact tension is transferred through the deck cable 3 to the sliding sheave assembly where it is divided into two paths. Thus, in the single reeved engine of Figure 1, the tension will enter the engine 13 along four paths, i.e. the two purchase cables 3a leading to the engine and the two anchor cables 3b leading from the engine 13. The tension waves are all moving at the speed of sound in the cables so the effect is that of halving the reeve of the engine. This effect reduces the number of cables that will be slack when the crosshead moves. The demand for cable from both the anchor and the deck end of the cable system will cause the sliding sheave assembly to move in the direction of the purchase cable 3a from the anchor cable 3b. This motion supplies cable fast enough to lower the cable tension in the portion of the cable cross-deck.

Due to the tensioning of anchor cable 3b, the slack at the anchor 25 will be entirely removed. The tension resulting from the pressure loading on the crosshead 18 remains fairly constant since any longitudinal impulse at the deck will cause a movement in the sliding sheave assembly rather than a resonant vibration. Small impacts are removed by the action of the shock absorbers 8 and 24.

The sheave system has a tendency to return to battery, that is, the position of readiness for making an arrest, since the same reeve, or mechanical advantage, was selected at the anchor end as at the deck end of the purchase cable.

The motion of the sliding sheave assembly in the initial phases of an arrestment substitutes its small inertia for the large inertia of the engine crosshead 18. This motion delays the application of the major arresting loads at the crosshead until the crosshead has been accelerated to a relatively high velocity. This increase in velocity lowers the effect of inertia of the engine.

With relation to the modification of Figure 2, the system operates basically in the same manner as the syster of Figure 1. In this case, however, sliding sheave 107 obtains the immediate impact of the load 102 and immediately transfers part of it to the opposite sheave 109. Thus, in a limited sense there is an initial absorbing of the terrific impact created by load 102.

Obviously many modifications and variations of the present invention are possible in the light of the above teachings. It is therefore to be understood that within the scope of the appended claims the invention may be practiced otherwise than as specifically described.

What is claimed is:

1. In a force arresting system having a cable with a purchase portion reeved into an arresting engine and an anchoring portion reeved from the engine and tied to an anchor, the improvement comprising a fixed track means, reciprocable means mounted for sliding in said track, a first sheave reciprocably mounted on said reciprocable means, a fixed sheave immovably mounted with respect to and on said reciprocable means, the purchase portion of said cable being reeved through said first sheave and the anchoring portion through said fixed sheave so that force to be arrested is subjected in sequence to the inertias of said first sheave, reciprocable means and the arresting engine and whereby a reduction in tension in the anchoring portion permits the reciprocable means to move toward the purchase portion providing it with additional cable.

2. The device of claim 1 wherein said reciprocable means includes a shock absorber having a cylinder with a piston, said first sheave being secured for movement with said piston and said fixed sheave being secured to said cylinder.

3. A force arresting system for halting an object moving in a definite path comprising a cable disposed across the path of said object for engagement therewith, an arresting engine, an anchor means, a pair of guide tracks disposed on opposite sides of said path, a reciprocable means mounted for sliding movement in each of said tracks, a movable sheave reciprocably mounted on each of said reciprocable means for movement therewith and relative thereof, and a fixed sheave secured to each of said reciprocable means for movement therewith, each end of said cable being reeved through one of said movable sheaves and into said arresting engine, from said engine through said fixed sheave, and tied to said anchor means.

References Cited in the file of this patent

UNITED STATES PATENTS

| | | |
|---|---|---|
| Re. 24,306 | Doolittle | Apr. 23, 1957 |
| 2,474,858 | Nicholson | July 5, 1949 |
| 2,802,631 | Ringleb | Aug. 13, 1957 |
| 2,814,365 | Snow | Nov. 26, 1957 |

FOREIGN PATENTS

| | | |
|---|---|---|
| 663,710 | Great Britain | Dec. 27, 1951 |